(12) United States Patent
Saiki et al.

(10) Patent No.: US 6,773,001 B2
(45) Date of Patent: Aug. 10, 2004

(54) VIBRATION ISOLATION MOUNT

(75) Inventors: Akio Saiki, Komaki (JP); Hideki Maehashi, Kasugai (JP); Mitsuhiro Takayanagi, Komaki (JP); Takanobu Nanno, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/395,341

(22) Filed: Mar. 25, 2003

(65) Prior Publication Data

US 2003/0183997 A1 Oct. 2, 2003

(30) Foreign Application Priority Data

Mar. 26, 2002 (JP) ........................................ 2002-086822
Nov. 28, 2002 (JP) ........................................ 2002-345007

(51) Int. Cl.[7] .............................................. F16M 1/00
(52) U.S. Cl. ................................... 267/140.4; 267/294
(58) Field of Search ................................. 267/141, 153, 267/140.11, 140.3, 141.1, 141.2, 292, 294, 140.13, 141.4

(56) References Cited

U.S. PATENT DOCUMENTS

| | | | | |
|---|---|---|---|---|
| 4,757,982 A | * | 7/1988 | Andra et al. | ............ 267/140.13 |
| 5,215,382 A | * | 6/1993 | Kemeny | ...................... 384/36 |
| 5,775,720 A | * | 7/1998 | Kmiec et al. | ............. 267/64.15 |
| 5,788,207 A | * | 8/1998 | Bunker | ......................... 267/141 |
| 6,254,072 B1 | * | 7/2001 | Bono et al. | .................. 267/292 |
| 6,435,489 B1 | * | 8/2002 | Rice et al. | ................ 267/140.3 |

FOREIGN PATENT DOCUMENTS

| | | |
|---|---|---|
| JP | 8-1230 | 1/1996 |
| JP | 8-296679 | 11/1996 |
| JP | 9-151991 | 6/1997 |
| JP | 11-132275 | 5/1999 |
| JP | 2001-3987 | 1/2001 |

* cited by examiner

Primary Examiner—Robert A. Siconolfi
Assistant Examiner—Melanie Torres
(74) Attorney, Agent, or Firm—Oblon, Spivak, McClelland, Maier & Neustadt, P.C.

(57) ABSTRACT

A rear engine mount includes a rectangular upper metal plate member, a metal stopper member, and a lower metal plate member. The metal stopper member includes a pair of side plates, and a bottom plate. The lower metal plate member is disposed a predetermined distance away from the upper metal plate member in a facing condition, with the metal stopper member disposed therebetween, and includes a pair of retaining portions provided at opposite end positions. A second stopper portion includes a pair of vertical plate portions standing on the lower metal plate member, and a horizontal plate member which is attached to the ends of the vertical plate portions and extended over the bottom plate of the metal stopper member. A pair of elastic rubber support members is bonded to the lower surface of the upper metal plate member at opposite end portions.

20 Claims, 10 Drawing Sheets

VIBRATION ISOLATION MOUNT

BACKGROUND OF THE INVENTION

1. Field of the Invention

The present invention relates to a vibration isolation mount, and more particularly to a vibration isolation mount for supporting a transmission of a vehicle on a vehicle body in a vibration-isolated condition.

2. Description of the Related Art

Conventionally, a vibration isolation mount of this kind includes, for example, as shown in FIG. 15, a first platelike metal member 1, which is a rectangular metal plate, and a second platelike metal member 2, which is a rectangular metal plate. The first platelike metal member 1 is bent at substantially trisecting positions with respect to the longitudinal direction in such a manner that opposite end portions extend obliquely upward toward the same side and at the same angle. The second platelike metal member 2 is bent at longitudinally near-end positions at the same angle in such a manner as to be directed toward substantially the same directions as is the first platelike metal member 1. The second platelike metal member 2 is disposed substantially in parallel with the first platelike metal member 1 with a predetermined distance maintained therebetween. A pair of elastic rubber support members 3 are sandwiched between the first and second platelike metal members 1 and 2 so as to elastically connect the first and second platelike metal members 1 and 2. More specifically, each of the elastic rubber support members 3 is sandwiched between respective opposite bent portions of the first platelike metal member 1 and the second platelike metal member 2. A through-hole 1a is formed at the center of a horizontal portion of the first platelike metal member 1. An annular flange member 4 is coaxially fixed to the circumferential edge of the through-hole 1a. The annular flange member 4 slightly protrudes from the through-hole 1a upward and downward. A rubber covering portion 5 covers the flange member 4.

A small hole 2a is formed at the center of a horizontal portion of the second platelike metal member 2. A tubular metal member 6 is provided on the upper surface of the second platelike metal member 2 in such a manner as to stand around the small hole 2a. The tubular metal member 6 extends through the flange member 4, and the upper end of the tubular metal member 6 protrudes from the flange member 4. A metal stopper 6a is fixedly attached to the protruding end of the tubular metal member 6. The metal stopper 6a extends radially outward from the tubular metal member 6 and has a diameter slightly greater than that of the flange member 4. A bolt 7 is inserted into the tubular metal member 6 from the metal stopper 6a side such that its head is caught on the metal stopper 6a while its threaded end portion is screwed into a nut 8, which is fixedly attached to a central portion of the outer surface of the second platelike metal member 2. This vibration isolation mount is mounted on, for example, an FR (front engine rear drive) vehicle such that the first platelike metal member 1 is attached to a transmission section (or a vehicle body frame) and the second platelike metal member 2 is attached to the vehicle body frame (or the transmission section).

In the above-described vibration isolation mount, within a limited space provided between the elastic rubber support members 3, the flange member 4 is covered with the rubber covering portion 5. Through employment of this configuration, vertical vibrations input to the mount are damped by means of the elastic rubber support members 3 and the rubber covering portion 5, the rigidity of the mount in the front-and-rear direction is enhanced, and the rigidity of the mount in the right-and-left direction is appropriately adjusted, thereby improving riding comfort and enhancing steering stability.

The above-described vibration isolation mount requires a large number of metal component parts, including the first and second platelike metal members 1 and 2, the flange member 4, the tubular metal member 6, the metal stopper 6a, the bolt 7, and the nut 8. Additionally, a resin cap 9 for covering the nut 8 is required. Therefore, the cost of component parts is high. Also, welding must be performed for joining the first platelike metal member 1 and the flange member 4, the second platelike member 2 and the tubular metal member 6, the second platelike member 2 and the nut 8, and the tubular metal member 6 and the metal stopper 6a. Thus, the cost of welding is high. Furthermore, the elastic rubber support members 3 provided between the first and second platelike metal members 1 and 2 and the rubber covering portion 5 for Covering the flange member 4 must be formed through rubber vulcanization molding. Thus, the cost of pretreatment of the metal members for vulcanization molding and the cost of bonding agent are increased. Therefore, the cost of manufacturing the vibration isolation mount, including the cost of metal component parts, the cost of welding, and the cost of vulcanization molding, is high. Thus, reduction in the cost of the vibration isolation mount has been required.

Also, in the above-described vibration isolation mount, the first and second platelike metal members 1 and 2 assume an elongated structure such that bent portions extend in longitudinally opposite directions from a central portion. Therefore, the first and second platelike metal members 1 and 2 must assume an increased thickness in order to have a required strength, resulting in increase weight thereof. Also, being provided between bent portions of the first and second platelike metal members 1 and 2, the elastic rubber support members 3 are in an inclined position; thus, the elastic rubber support members 3 must be increased in thickness. As a result, the first and second platelike metal members 1 and 2 each resonate; i.e., have a resonance peak in a low frequency band, thereby generating dull sound.

SUMMARY OF THE INVENTION

An object of the present invention is to solve the above-mentioned problems in the conventional vibration isolation mount and to provide a vibration isolation mount which can be manufactured from a small number of component parts and according to a simple process without sacrifice of vibration-isolating performance, to thereby reduce cost.

To achieve the above object, the prevent invention provides a vibration isolation mount comprising a first platelike metal member assuming a rectangular shape, a first stopper member, a second platelike metal member, a second stopper member, a pair of elastic rubber support members, and an elastic rubber covering portion. The first stopper member comprises a pair of side plates, and a bottom plate. The side plates and the bottom plate are integrally formed into a shape resembling the letter U. End portions of the side plates are fixedly attached to one plane of the first platelike metal member at longitudinally opposite end portions so as to provide the first stopper member fixedly standing on the plane. The second platelike metal member is disposed a predetermined distance away from the first platelike metal member in a facing condition, with the first stopper member disposed therebetween. The second platelike metal member comprises a retaining portion provided at each of opposite ends thereof located in opposition to the opposite end portions of the first platelike metal member. The second stopper member is provided on the second platelike metal member at a longitudinally intermediate position in such a manner as to stand toward the first platelike metal member. An end portion of the second stopper member can be caught by the bottom plate of the first stopper member on the side toward the first platelike metal member so as to restrict the distance between the first platelike metal member and the second platelike metal member to a predetermined range. The paired elastic rubber support members are bonded to the plane of the first platelike metal member at the opposite end portions of the plane and extend toward the second platelike metal member. End portions of the elastic rubber support members are press-fitted in the corresponding retaining portions of the second platelike metal member so as to elastically connect the first and second platelike metal members. The elastic rubber covering portion is formed integrally with the elastic rubber support members and covers the surface of the bottom plate of the first stopper member.

The thus-configured vibration isolation mount of the present invention functions in the following manner. Main vibrations imposed vertically between the first and second platelike metal members are damped by means of the paired elastic rubber support members, which elastically connect the first and second platelike metal members. Furthermore, the paired elastic rubber support members enhance the rigidity of the vibration isolation mount with respect to the longitudinal direction of the mount (the right-and-left direction of vehicle) and allow appropriate adjustment of the rigidity of the vibration isolation mount with respect to the width direction of the mount (the front-and-rear direction of vehicle). Such control of vibrations in the front-and-rear and right-and-left directions improves riding comfort and enhances steering stability. Upon input of an excessive rebound in the vertical direction, an end portion of the second stopper member and the bottom plate of the first stopper member are caught by each other, thereby suppressing excessive tensile deformation of the elastic rubber support members in the vertical direction. Thus, the durability of the elastic rubber support members is ensured. Since the first and second stopper members are caught by each other, separation of the first and second platelike metal members is reliably prevented.

The present invention employs four metal members; specifically, the first platelike metal member, the second platelike metal member, the first stopper member, and the second stopper member, thereby considerably reducing the number of metal members as compared with the conventional vibration isolation mount. Also, since welding is only involved in joining the first platelike metal member and the first stopper member and in forming the second stopper member, assembly of the vibration isolation mount of the present invention involves less welding than does assembly of the conventional vibration isolation mount. Furthermore, vulcanization molding is collectively performed only once in forming a molding assembly of the first platelike metal member, the first stopper member, the elastic rubber support members, and the elastic rubber covering portion. Thus, vulcanization molding is performed fewer times and on fewer portions as compared with the case of manufacturing the conventional vibration isolation mount. Therefore, the cost of manufacturing the vibration isolation mount is considerably reduced.

According to the present invention, the elastic rubber support members are bonded to the first platelike member, and end portions of the elastic rubber support members are press-fitted in the corresponding retaining portions of the second platelike metal member; i.e., the elastic rubber support members are not bonded to the second platelike metal member. Thus, a molding assembly of the first platelike metal plate and the elastic rubber support members formed through vulcanization molding and bonding can be removed from a mold without involvement of demolding of the second platelike member of a complicated structure including the retaining portions. Therefore, the demolding structure of the mold can be simplified, and the molding assembly can be easily removed from the mold. Thus, the cost of mold is considerably reduced.

In the vibration isolation mount of the present invention, preferably, the second stopper member is formed in a U-like shape and disposed in such a manner as to surround the bottom plate. The second stopper member includes a pair of vertical plate portions standing on the second platelike metal member at a longitudinally intermediate position so as to sandwich the bottom plate of the first stopper member in a width direction thereof in such a manner that the vertical plate portions are separated from the bottom plate of the first stopper member, and a horizontal plate portion which connects the vertical plate portions.

Thus, upon input, to the vibration isolation mount, of an excessive rebound in the vertical direction, the horizontal plate portion of the second stopper member abuts the bottom plate of the first stopper member, thereby suppressing excessive deformation of the elastic rubber support members in the vertical direction. Also, since the first and second stopper members are caught by each other, separation of the first and second platelike metal members is reliably prevented. Upon input of excessive vibration component in the longitudinal direction, the horizontal plate portion of the second stopper member abuts the side plate of the first stopper member, thereby suppressing excessive deformation of the elastic rubber support members in the longitudinal direction. Upon input of excessive vibration component in the lateral direction, the vertical plate portion of the second stopper member abuts the bottom plate of the first stopper member, thereby suppressing excessive deformation of the elastic rubber support members in the lateral direction. Therefore, excessive tensile deformation of the elastic rubber support members in the vertical, right-and-left, and front-and-rear directions is suppressed, whereby the durability of the elastic rubber support members is ensured.

In the vibration isolation mount of the present invention, preferably, a through-hole is provided at the center of the bottom plate of the first stopper member, and the second stopper member comprises a vertical portion and a stopper plate. The vertical portion stands on the second platelike metal member at a longitudinally intermediate position and extends through the through-hole toward the first platelike metal member. The stopper plate is fixedly attached to an end of the vertical portion in such a manner as to be able to be caught by the bottom plate. Thus, upon input, to the vibration isolation mount, of an excessive rebound in the vertical direction, the stopper plate of the second stopper member abuts the bottom plate of the first stopper member at the periphery of the through-hole, thereby suppressing excessive deformation of the elastic rubber support members in the vertical direction. Also, since the first and second stopper members are caught by each other, separation of the first and second platelike metal members is reliably prevented. Upon input of excessive vibration component in the longitudinal direction, the vertical portion of the second stopper member abuts the bottom plate of the first stopper member at the wall of the through-hole, thereby suppressing excessive deformation of the elastic rubber support members in the longitudinal direction. Upon input of excessive vibration component in the lateral direction, the vertical portion of the second stopper member abuts the bottom plate of the first stopper member at the wall of the through-hole, thereby suppressing excessive deformation of the elastic rubber support members in the lateral direction. As a result, the durability of the elastic rubber support members is ensured.

In the vibration isolation mount of the present invention, preferably, the first platelike metal member and the second platelike metal member substantially assume the form of a flat plate, and the elastic rubber support members substantially assume the form of a rectangular parallelepiped block. Thus, the first stopper member—which extrudes from the first platelike metal member toward the second platelike metal member—and a second stopper member—which stands on the second platelike metal member and whose end portion can be caught by the bottom plate of the first stopper member on the side toward the first platelike metal member—constitute a rebound stopper structure. In contrast to the conventional vibration isolation mount, a stopper portion does not protrude outward from the first platelike metal member. Therefore, the vibration isolation mount of the present invention allows the first and second platelike metal members to substantially assume the form of a simple, flat plate. In the vibration isolation mount, since a pair of side plates of the first stopper member are fixedly attached to longitudinally opposite end portions of the first platelike metal member, the rigidity of the first platelike metal member is enhanced. Therefore, even when the first platelike metal member is formed into the shape of a flat plate, its thickness can be reduced. Also, since the first platelike metal member is formed into the shape of a flat plate, the second platelike metal member can be formed into the shape of a flat plate, so that the thickness of the second platelike metal member can be reduced. Thus, since the first and second platelike metal members can be reduced in thickness, the weight of the vibration isolation mount is reduced.

In the vibration isolation mount of the present invention, since the first and second platelike metal members assume the form of a flat plate, the elastic rubber support members can substantially assume the form of a rectangular parallelepiped block which is not inclined with respect to the axial direction. Substantially assuming the form of a rectangular parallelepiped block, the elastic rubber support members exhibit enhanced rigidity with respect to the vertical direction of a vehicle. Therefore, as compared with the conventional vibration isolation mount, the elastic rubber support members can be reduced in wall thickness as measured along the longitudinal direction of the vibration isolation mount, whereby the spring constant of the vibration isolation mount can be reduced with respect to the longitudinal and lateral directions. Furthermore, as a result of impartment of the form of a flat plate to the first and second platelike metal members, the resonance frequency of the first and second platelike metal members can be shifted toward high-frequency side, thereby avoiding generation of dull sound of a low frequency band which is observed in the conventional vibration isolation mount.

In the vibration isolation mount of the present invention, preferably, the retaining portions of the second platelike metal member comprise a pair of first engagement portions, two pairs of second engagement portions, and a pair of recess portions. The paired first engagement portions stand toward the first platelike metal member at the corresponding longitudinal ends of the second platelike metal member. Each pair of second engagement portions stands toward the first platelike metal member at laterally opposite ends of the second platelike metal member and in the vicinity of the corresponding longitudinal end of the second platelike metal member. Each of the paired recess portions is provided between the corresponding first engagement portion and the corresponding paired second engagement portions. Thus, end portions of the elastic rubber support members are press-fitted in the corresponding retaining portions of the second platelike metal member in such a manner as to be press-fitted in the corresponding recess portions while being compressed through abutment with the paired first engagement portions standing at longitudinally opposite ends of the second platelike metal member and abutment with two pairs of second engagement portions, each pair standing at the laterally opposite ends of the second platelike metal member and in the vicinity of the corresponding longitudinal end of the second platelike metal member. Thus, the elastic rubber support members are firmly fitted in the corresponding retaining portions. As a result, the elastic rubber support members appropriately exhibit vibration-isolating characteristics.

In the vibration isolation mount of the present invention, preferably, the first engagement portions and/or the second engagement portions are bent toward the corresponding recess portions of the second platelike metal member in such a manner as to overhang the recess portions. Being bent toward the recess portions, each of the first engagement portions and/or the second engagement portions assumes an inlet-narrowed pocket-like structure. Thus, end portions of the elastic rubber support members are press-fitted in the retaining portions of the second platelike metal member while being firmly caught in such pocket portions. Therefore, the elastic rubber support members are more firmly fitted in the corresponding retaining portions.

In the vibration isolation mount of the present invention, preferably, the first engagement portions and/or the second engagement portions are bent toward the corresponding recess portions of the second platelike metal member in such a manner as to overhang the recess portions, and end parts of the first engagement portions and/or end parts of the second engagement portions are bent away from the corresponding recess portions. Being bent away from the recess portions, the end parts serve as guides, so that end portions of the elastic rubber support members can be smoothly fitted into the retaining portions.

In the vibration isolation mount of the present invention, preferably, in place of the first engagement portions, a first linear protrusion is provided in each of the recess portions of the second platelike metal member at a longitudinally intermediate position in such a manner as to protrude toward the same side as do the second engagement portions and to extend in the lateral direction, or in place of the second engagement portions, a second linear protrusion is provided in each of the recess portions of the second platelike metal member at a laterally intermediate position in such a manner as to protrude toward the same side as do the first engagement portions and to extend in the longitudinal direction; furthermore, an engagement groove is formed on each of end portions of the elastic rubber support members so as to be engaged with the first protrusion or the second protrusion. Engagement of the first linear protrusions of the second platelike metal member with the corresponding engagement grooves on the elastic rubber support members prevents longitudinal movement of the elastic rubber support members as in the case where the first engagement portions are provided. Alternatively, engagement of the second linear protrusions of the second platelike metal member with the corresponding engagement grooves on the elastic rubber support members prevents lateral movement of the elastic rubber support members as in the case where the second engagement portions are provided.

In the vibration isolation mount of the present invention, preferably, end portions of the elastic rubber support members to be press-fitted into the corresponding retaining portions comprise positioning protrusions protruding to the outside of the retaining portions through cutout portions provided between the first and second engagement portions so as to be caught on the first and second engagement portions. Being caught on the first and second engagement portions, the positioning protrusions reliably prevent longitudinal and lateral movement of the end portions of the elastic rubber support members in the vibration isolation mount.

DESCRIPTION OF THE PREFERRED EMBODIMENTS

Figure 1:
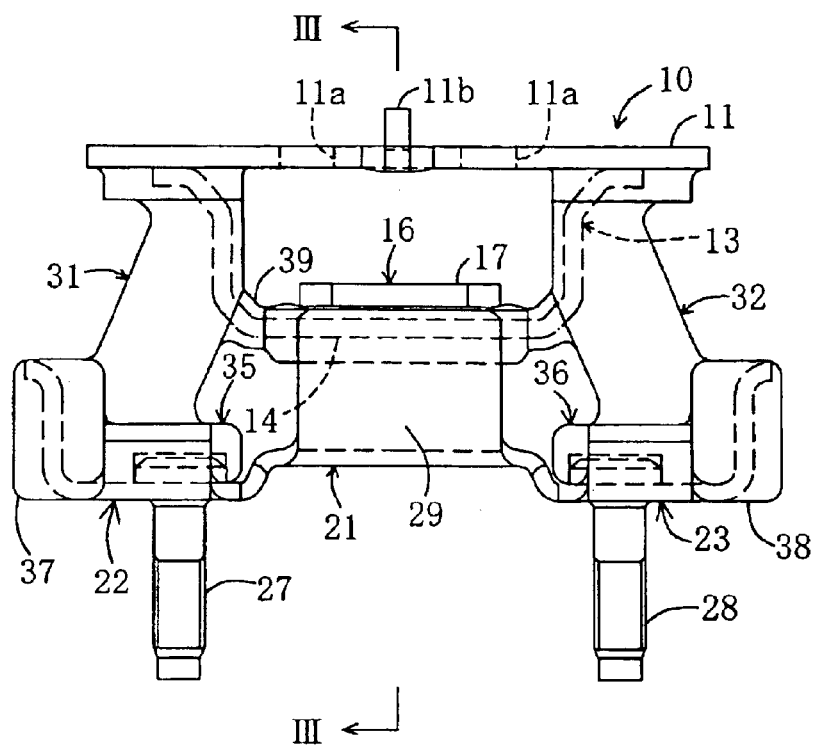
FIG. 1 is a front view schematically showing a rear engine mount according to a first embodiment of the present invention.
Figure 2:
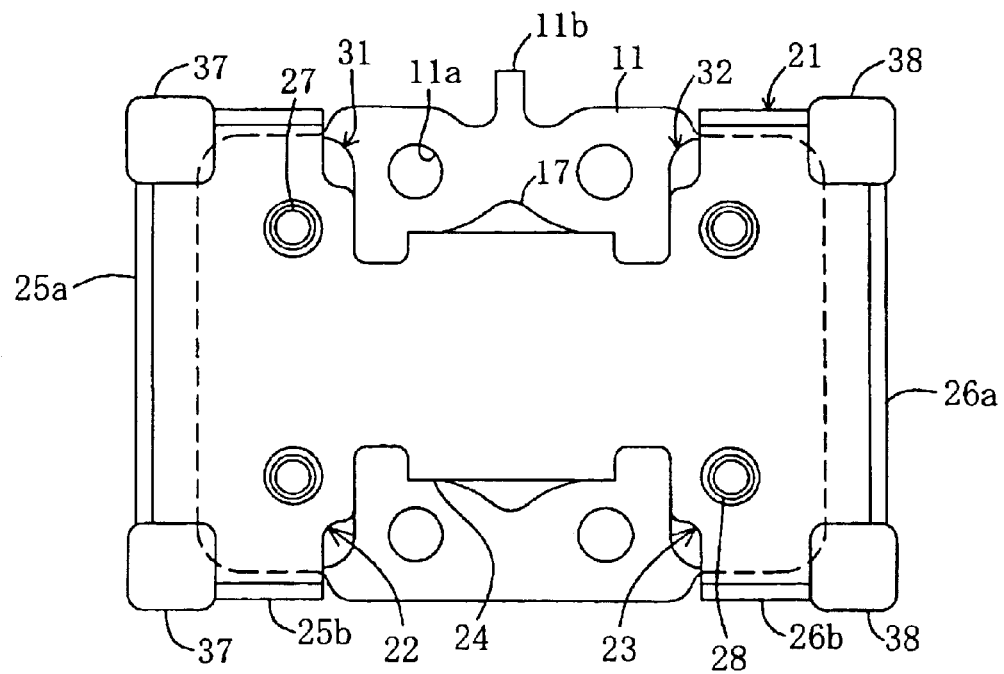
FIG. 2 is a bottom view schematically showing the rear engine mount of FIG. 1.
Figure 3:
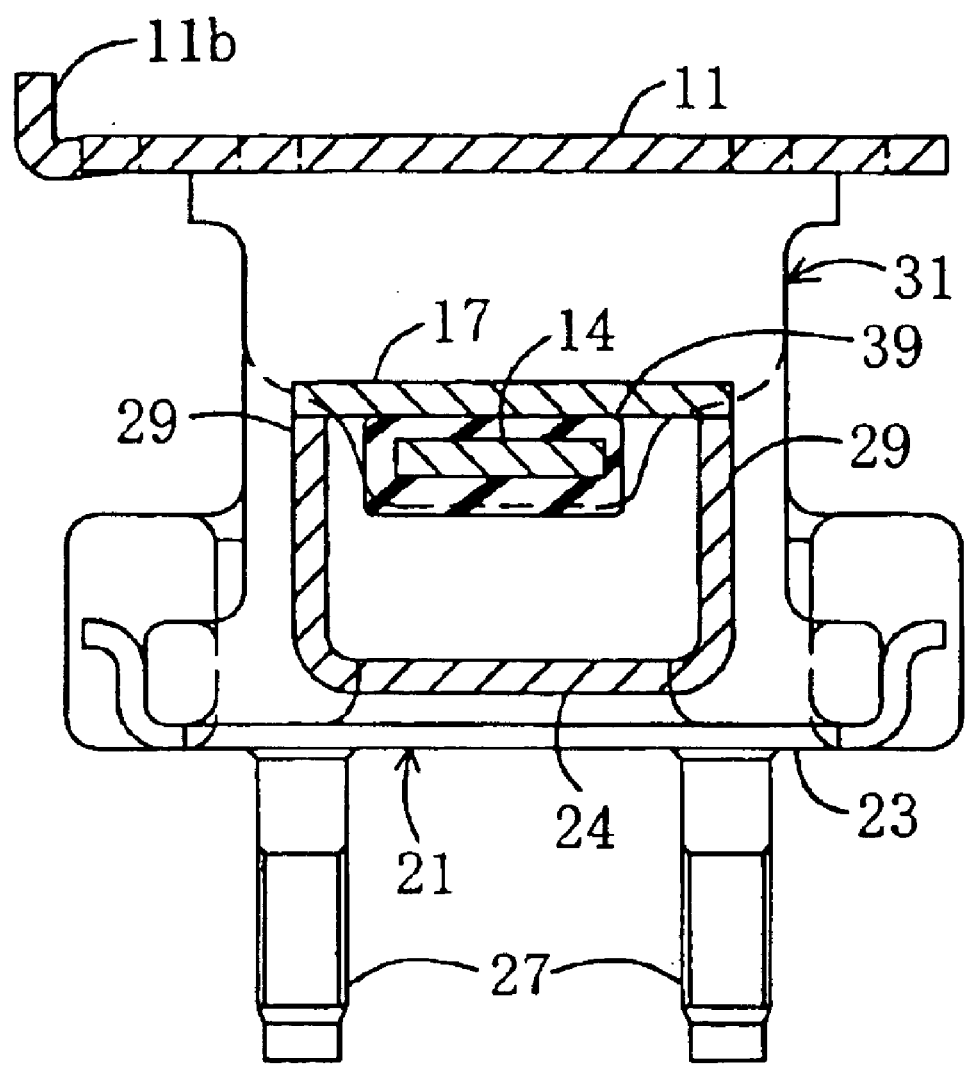
FIG. 3 is a schematic sectional view of the rear engine mount taken along line III—III of FIG. 1.

Embodiments of the present invention will next be described in detail with reference to the drawings.
First Embodiment FIGS. 1 to 3 show a rear engine mount according to a first embodiment of the present invention, and which is a vibration isolation mount to be mounted in an FR-type vehicle between a transmission section and a vehicle body frame, by means of a front view, a plan view, and a sectional view taken along line III—III of FIG. 1.

The rear engine mount 10 includes an upper metal plate member (first platelike metal member) 11, a metal stopper member (first stopper member) 13, a lower metal plate member (second platelike metal member) 21, a second stopper portion (second stopper member)16, a pair of elastic rubber support members 31 and 32, and an elastic rubber covering portion 39. The upper metal plate member 11 is a rectangular, flat plate made of iron. The metal stopper member 13 is fixedly attached to the lower surface of the upper metal plate member 11 at opposite end portions thereof and protrudes downward in a shape resembling the letter U. The lower metal plate member 21 is disposed a predetermined distance away from the upper metal plate member 11 in a facing condition while the metal stopper member 13 is disposed therebetween. The second stopper portion 16 stands on the lower metal plate member 21 at a longitudinally intermediate position while surrounding a bottom plate 14 of the metal stopper member 13. The paired elastic rubber support members 31 and 32 are bonded to corresponding opposite end portions of the lower surface of the upper metal plate member 11 and extend toward the lower metal plate member 21. End portions of the elastic rubber support members 31 and 32 are press-fitted in corresponding retaining portions 22 and 23, which will be described later, of the lower metal member 11. In this manner, the elastic rubber support members 31 and 32 elastically connect the upper and lower metal plate members 11 and 21. The elastic rubber covering portion 39 is formed integrally with the elastic rubber support members 31 and 32 and covers the bottom plate 14 of the metal stopper member 13. In the state of the rear engine mount 10 being mounted on a vehicle, the right-and-left and vertical directions in FIG. 1 correspond to the right-and-left and vertical directions of the vehicle, and the direction perpendicular to the paper on which FIG. 1 appears corresponds to the front-and-rear direction of the vehicle.

Figure 4A:
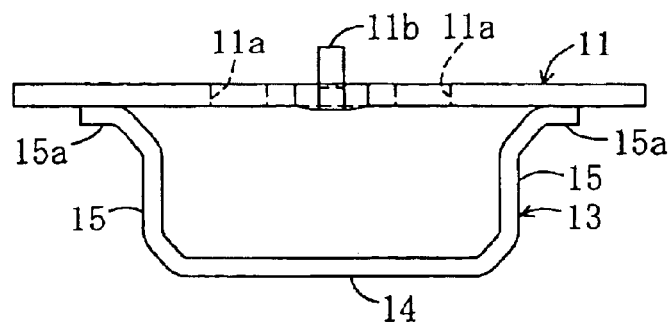
FIGS. 4A, 4B, and 4C are a front view, a bottom view, and a left-hand side view schematically showing an assembly of an upper metal plate member and a metal stopper member.
Figure 4B:
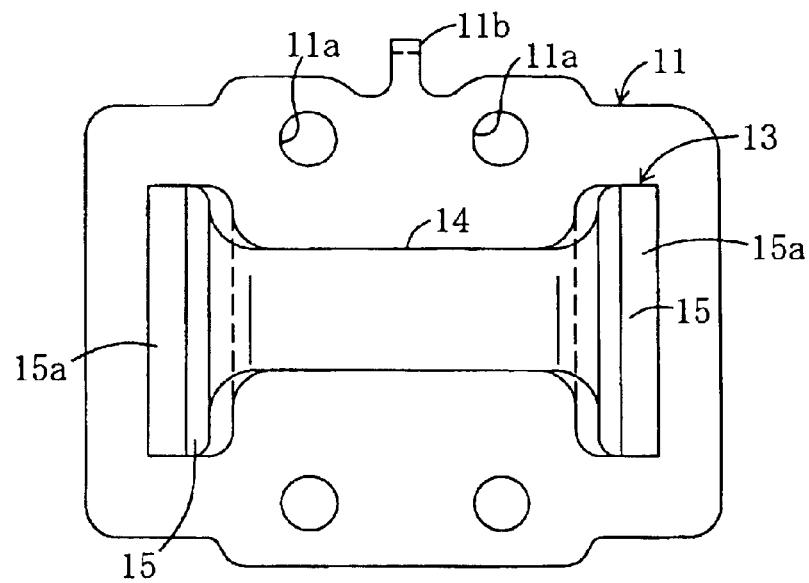
Figure 4C:
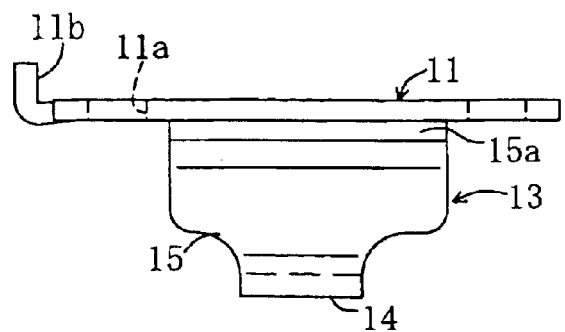

As shown in FIGS. 4A to 4C, the upper metal plate member 11 has four mounting holes 11a formed in such a manner as to extend therethrough and to be located symmetrically with respect to the longitudinal and lateral centerlines thereof and in the vicinity of laterally opposite ends thereof. The upper metal plate member 11a also has an L-shaped positioning protrusion 11b provided at a center of the upper metal plate member 11 with respect to the longitudinal direction to be located at one end with respect to the lateral direction (at the front side end in the drawings). The positioning protrusion 11b has a horizontal portion projecting horizontally from the upper metal plate member 11 and a short vertical portion extending upward from the end of the horizontal portion. The metal stopper member 13 includes the bottom plate 14 and a pair of side plates 15, which stand vertically at opposite ends of the bottom plate 14, thereby assuming a shape which resembles the letter U and is longitudinally and laterally symmetrical. The width of the bottom plate 14 is substantially half that of the side plates 15. The bottom plate 14 and each of the side plates 15 are smoothly connected along curved lines. An end portion of each of the side plates 15 is bent outward at a right angle to thereby form a mounting end portion 15a. The metal stopper member 13 is integrally formed from an iron plate through press working and bending. The mounting end portions 15a of the metal stopper member 13 are welded to the upper metal plate member 11 in the vicinity of longitudinally opposite ends thereof, whereby the metal stopper member 13 is fixedly attached to the upper metal plate member 11.

Figure 5:
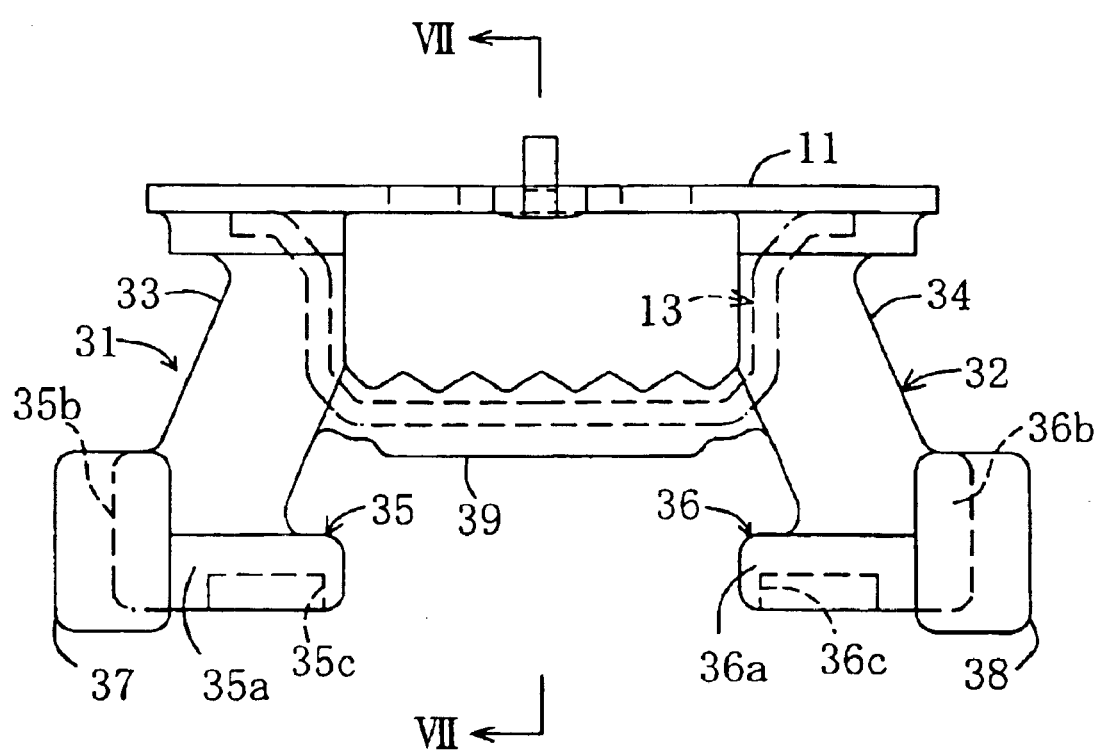
FIG. 5 is a front view schematically showing a rubber vulcanization molding assembly M formed through subjection of the assembly of FIG. 4 to rubber vulcanization molding.
Figure 6:
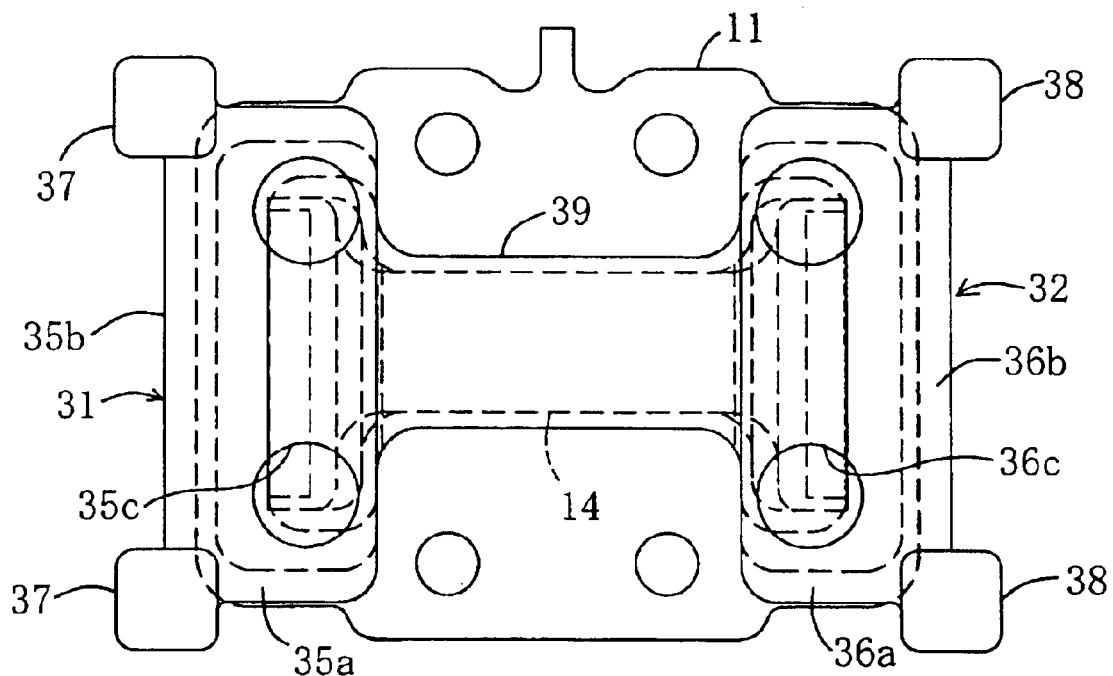
FIG. 6 is a bottom view schematically showing the rubber vulcanization molding assembly M.
Figure 7:
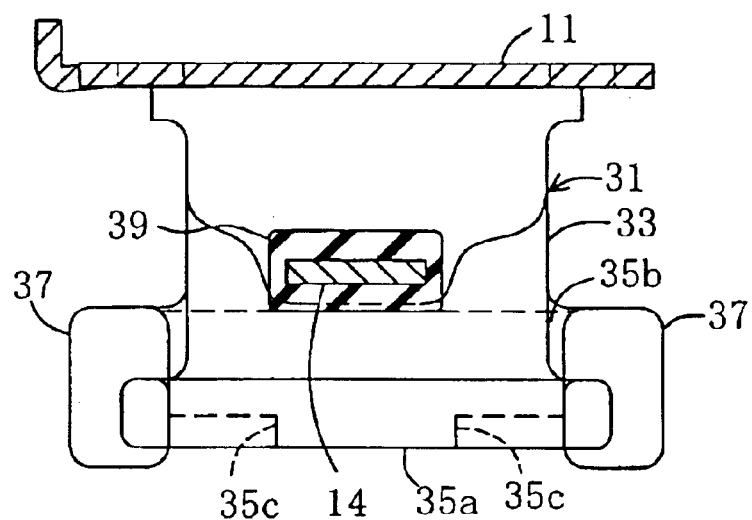
FIG. 7 is a sectional view of the rubber vulcanization molding assembly M taken along line VII—VII of FIG. 5.

As shown in FIGS. 5 to 7, the elastic rubber support member 31 (32) substantially assumes the form of a rectangular parallelepiped block and includes an arm portion 33 (34) and an engagement portion 35 (36). The arm portion 33 (34) is bonded to a longitudinally leftward (rightward) end portion of the upper metal plate member 11 and extends downward while being slightly inclined leftward (rightward), or outward. The engagement portion 35 (36) is integrally formed at the lower end of the arm portion 33 (34). The arm portions 33 and 34 are formed through vulcanization molding and bonding in such a manner as to enclose the corresponding mounting end portions 15a and side plates 15 of the metal stopper member 13. The engagement portion 35 (36) includes a flat plate portion 35a (36a) and a vertical portion 35b (36b). The flat plate portion 35a (36a) is formed at the lower end of the elastic rubber support member 31 (32) and assumes a rectangular flat platelike form. The vertical portion 35b (36b) stands at the leftward (rightward) end of the flat plate portion 35a (36a), whereby the vertical portion 35b (36b) and the flat plate portion 35a (36a) form a shape resembling the letter L. Two engagement recesses 35c (36c) are formed on the bottom surface of the flat plate portion 35a (36a) in such a manner as to be located in the vicinity of the opposite ends of the flat plate portion 35a (36a) with respect to the front-and-rear direction while being offset inward from the outer end of the flat plate portion 35a (36a) with respect to the right-and-left direction. The engagement recesses 35c (36c) accommodate the heads of corresponding bolts 27 (28), which will be described later. A pair of positioning protrusions 37 (38) each assuming the form of a vertically extending quadrangular prism are formed at the outer corners of the engagement portion 35 (36). Notably, the positioning protrusions 37 and 38 may be omitted as needed.

Covering the bottom plate 14 of the metal stopper member 13, the elastic rubber covering portion 39 is formed such that a part thereof on the upper surface of the bottom plate 14 assumes the form of a number of triangular ridges extending in the front-and-rear direction and arranged in the right-and-left direction and such that a part thereof on the lower surface of the bottom plate 14 assumes the form of a thick plate. A part of the elastic rubber covering portion 39 which covers a boundary portion between the bottom plate 14 and each of the side plates 15 is thin-walled and integrated with the elastic rubber support members 31 and 32. The elastic rubber support members 31 and 32 and the elastic rubber covering portion 39 are formed integrally with the upper metal plate member 11 through rubber vulcanization molding and bonding, thereby yielding a rubber vulcanization molding assembly M as shown in FIGS. 5 to 7. Specifically, an assembly of the upper metal plate member 11 and the metal stopper member 13 is set in a mold (not shown), and then a rubber material is injected into the mold to thereby perform rubber vulcanization molding. Since the elastic rubber support members 31 and 32 are vulcanization-bonded to the upper metal plate member 11 as described above, but are not bonded to the lower metal plate member 21, the rubber vulcanization molding assembly M can be removed from the mold without involvement of demolding of the lower metal plate member 21 of a complicated structure including first engagement portions 25a and 26a, second engagement portions 25b and 26b, and vertical plate portions 29, which will be described later. Therefore, the demolding structure of the mold can be simplified, and the rubber vulcanization molding assembly M can be easily removed from the mold.

Figure 8A:
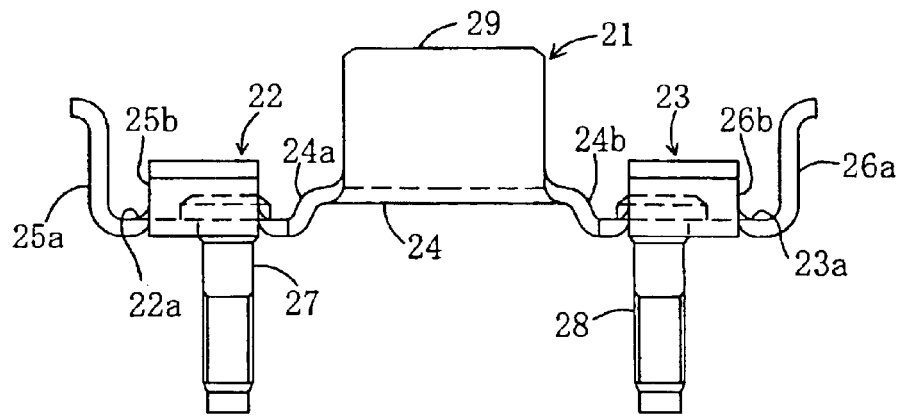
FIGS. 8A, 8B, and 8C are a front view, a bottom view, and a side view schematically showing a lower metal plate member.
Figure 8B:
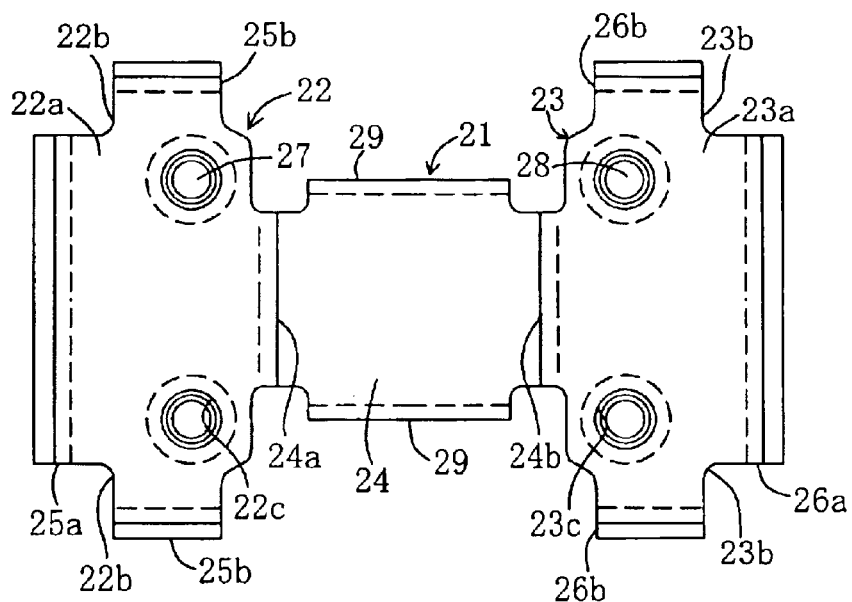
Figure 8C:
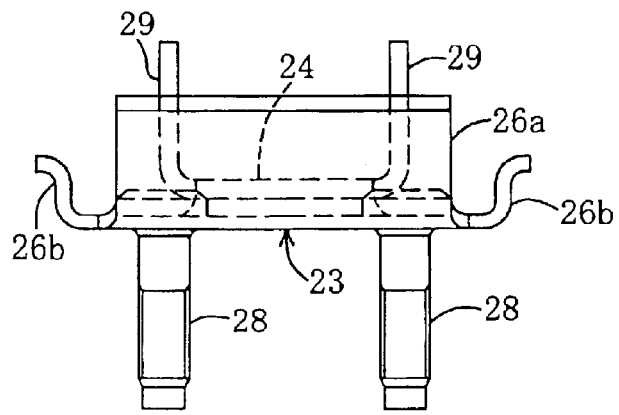

As shown in FIGS. 8A to 8C, the lower metal plate member 21 is a substantially flat elongated plate made of iron and assumes a longitudinally and laterally symmetrical shape. The lower metal plate member 21 includes the retaining portions 22 and 23 located at longitudinally opposite ends, and a central connection plate portion 24 which connects the opposite retaining portions 22 and 23. The lower metal plate member 21 is formed from an iron plate through press working and bending and is thinner than the upper metal plate member 11. Each of the retaining portions 22 and 23 assumes a rectangular shape elongated in the front-and-rear direction. The connection plate portion 24 assumes a substantially square shape. The retaining portions 22 and 23 are slightly sunk below the connection plate portion 24 and are in parallel with each other. A step portion 24a (24b) serves the boundary between the retaining portion 22 (23) and the connection plate portion 24. The retaining portion 22 (23) includes a flat recess 22a (23a), the first engagement portion 25a (26a), and a pair of second engagement portions 25b (26b). The first engagement portion 25a (26a) is formed through bending in such a manner as to stand vertically at the leftward (rightward) end of the recess 22a (23a) and to protrude toward the same side as does the connection plate portion 24. The paired second engagement portions 25b (26b) are formed in such a manner as to stand vertically at the frontward and rearward ends of the recess 22a (23a) and to protrude in the same direction as does the first engagement portion 25a (26a).

The retaining portion 22 (23) is configured such that a corner portion which bounds on each of the first engagement portions 25a (26a) and on each of the second engagement portions 25b (26b) is cut out so as to form a cutout portion 22b (23b), whereby an end part of each first engagement portion 25a (26a) and an end part of each second engagement portion 25b (26b) are separated from each other. The retaining portion 22 (23) has a pair of mounting holes 22c (23c) formed in the vicinity of the frontward and rearward ends of the step portion 24a (24b). The bolts 27 (28) are inserted from above into the corresponding mounting holes 22c (23c) such that threaded portions thereof protrude downward. While being caught on the upper surface of the retaining portion 22 (23), head portions of the bolts 27 (28) are welded to the retaining portion 22 (23). A pair of vertical plate portions 29 are formed through bending in such a manner as to stand perpendicularly upward at corresponding frontward and rearward end portions of the connection plate portion 24.

The above-described rubber vulcanization molding assembly M is fixedly attached to the lower metal plate member 21 such that the lower engagement portions 35 and 36 of the elastic rubber support members 31 and 32 are press-fitted to the retaining portions 22 and 23 of the lower metal plate member 21. The paired positioning protrusions 37 (38)—which each assume the form of a quadrangular prism and are formed at the corresponding outer corners of the engagement portion 35 (36)—protrude into the corresponding cutout portions 22b (23b) along the ends of the first and second engagement portions 25a and 25b (26a and 26b) to thereby be fixedly caught on the first and second engagement portions 25a and 25b (26a and 26b). In this unitary state of the rubber vulcanization molding assembly M being press-fitted to the lower metal plate member 21, the upper ends of the vertical plate portions 29 of the lower metal plate member 21 are located below the upper surface of the elastic rubber covering portion 39, which covers the bottom plate 14 of the metal stopper member 13.

When the upper metal plate member 11 is pressed down toward the lower metal plate member 21, the upper ends of the vertical plate portions 29 protrude above the upper surface of the elastic rubber covering portion 39. In this state, as shown in FIG. 1, opposite ends of a horizontal flat plate member 17 are welded to the corresponding upper ends of the vertical plate portions 29 while the horizontal plate member 17 extends over the upper surface of the elastic rubber covering portion 39. The horizontal plate member 17 and the vertical plate portions 29 constitute the second stopper portion 16. Thus is formed the rear engine mount 10 according to the present embodiment.

The rear engine mount 10 is mounted on a vehicle in the following manner. First, the upper metal plate member 11 is bolted on a transmission housing (not shown) via the mounting holes 11a. Next, the lower metal plate member 21 is fixedly mounted on a vehicle body frame (not shown) by use of the bolts 27 and 28. Thus, the upper metal plate member 11 bears a downward load (1W load) which is imposed from the transmission section, so as to support an engine. As a result, the upper metal plate member 11 moves by a predetermined dimension toward the lower metal plate member 21, thereby imposing a compressive load on the elastic rubber support members 31 and 32.

As the upper metal plate member 11 moves downward, the metal stopper member 13 moves downward, thereby forming a rebound clearance between the bottom plate 14 of the metal stopper member 13 and the horizontal plate member 17 of the second stopper portion 16 as well as a bound clearance between the bottom plate 14 of the metal stopper member 13 and the connection plate portion 24 of the lower metal plate member 21. When rebound vibration input becomes excessive, the bottom plate 14 abuts the horizontal plate member 17, thereby suppressing rebound vibration input. When bound vibration input becomes excessive, the bottom plate 14 abuts the connection plate portion 24, thereby suppressing bound vibration input.

In the thus-configured first embodiment, main vibrations imposed vertically on the upper and lower metal plate members 11 and 21 are damped by means of the elastic rubber support members 31 and 32, which elastically connect the upper and lower metal plate members 11 and 21. Furthermore, the paired elastic rubber support members 31 and 32 enhance the rigidity of the rear engine mount 10 with respect to the right-and-left direction and allow appropriate adjustment of the rigidity of the rear engine mount 10 with respect to the front-and-rear direction of vehicle. Upon input of an excessive rebound in the vertical direction, the horizontal plate member 17 of the second stopper portion 16 abuts the bottom plate 14 of the metal stopper member 13, thereby suppressing excessive tensile deformation of the elastic rubber support members 31 and 32 in the vertical direction. Thus, separation of the upper metal plate member 11 and the lower metal plate member 12 is reliably prevented.

Upon input of excessive vibration component in the right-and-left direction, the horizontal plate member 17 of the second stopper portion 16 abuts the side plate 15 of the metal stopper member 13, thereby suppressing excessive deformation of the elastic rubber support members 31 and 32 in the right-and-left direction. Upon input of excessive vibration component in the front-and-rear direction, the vertical plate portion 29 of the second stopper portion 16 abuts the bottom plate 14 of the metal stopper member 13, thereby suppressing excessive deformation of the elastic rubber support members 31 and 32 in the front-and-rear direction. In this manner, excessive deformation of the elastic rubber support members 31 and 32 in the vertical, front-and-rear, and right-and-left directions is suppressed, whereby the durability of the elastic rubber support members 31 and 32 is ensured. Furthermore, riding comfort of a vehicle is improved, and steering stability of the vehicle is enhanced.

The rear engine mount 10 employs four metal members; specifically, the upper metal plate member 11, the lower metal plate member 21, the metal stopper member 13, and the horizontal plate member 17 of the second stopper portion 16, thereby considerably reducing the number of metal members as compared with the conventional vibration isolation mount. As a result, the cost of metal members of the rear engine mount 10 is considerably reduced. Also, since welding is only involved in joining the upper metal plate member 11 and the metal stopper member 13 and in joining the horizontal plate member 17 and the vertical plate portions 29 so as to form the second stopper portion 16, assembly of the rear engine mount 10 involves less welding than does assembly of the conventional vibration isolation mount. Therefore, welding cost is reduced. Furthermore, vulcanization molding is collectively performed only once in forming a molding assembly of the upper metal plate member 11, the metal stopper member 13, the elastic rubber support members 31 and 32, and the elastic rubber covering portion 39. Thus, vulcanization molding is performed fewer times and on fewer portions as compared with the case of manufacturing the conventional rear engine mount. Therefore, the cost of pretreatment of metal members for rubber vulcanization molding and the cost of bonding agent can be eliminated. As a result, the cost of manufacturing the rear engine mount 10 is considerably reduced as compared with the case of manufacturing the conventional vibration isolation mount.

The rear engine mount 10 is configured such that the elastic rubber support members 31 and 32 are bonded to the upper metal plate member 11, and end portions of the elastic rubber support members 31 and 32 are press-fitted in the corresponding retaining portions 22 and 23 of the lower metal plate member 21; i.e., the elastic rubber support members 31 and 32 are not bonded to the lower metal plate member 21. Thus, the rubber vulcanization molding assembly M of the upper metal plate member 11 and the elastic rubber support members 31 and 32 formed through vulcanization molding and bonding can be removed from a mold without involvement of demolding of the lower metal plate member 21. Therefore, the demolding structure of the mold can be simplified. Thus, the cost of mold can be considerably reduced.

Also, in the rear engine mount 10, a rebound stopper structure composed of the metal stopper member 13 and the second stopper portion 16, which is composed of the horizontal plate member 17 and the vertical plate portions 29, is provided between the upper metal plate member 11 and the lower metal plate member 21. In contrast to the conventional vibration isolation mount, the rebound stopper structure does not protrude outward from the upper metal plate member 11. Therefore, the present embodiment allows the upper metal plate member 11 and the lower metal plate member 21 to substantially assume the form of a simple, flat plate. Also, since a pair of side plates 15 of the metal stopper member 13 are fixedly attached to longitudinally opposite end portions of the upper metal plate member 11, the rigidity of the upper metal plate member 11 is enhanced. Therefore, even though the upper metal plate member 11 assumes the form of a flat plate, its thickness can be reduced. Also, since the upper metal plate member 11 in the form of a flat plate can be attached to a vehicle, the thickness of the lower metal plate member 21 can be reduced even through the lower metal plate member 21 substantially assumes the form of a flat plate. Thus, since the upper and lower metal plate members 11 and 21 can be reduced in thickness as compared with the conventional vibration isolation mount, the weight of the upper and lower metal plate members 11 and 21 can be reduced.

Furthermore, as a result of impartment of the form of a flat plate to the upper and lower metal plate members 11 and 21, the resonance frequency of the upper and lower metal plate members 11 and 21 can be shifted toward high-frequency side, thereby avoiding generation of dull sound of a low frequency band which is observed in the conventional vibration isolation mount. Also, in the present embodiment, since the upper and lower metal plate members 11 and 21 assume the form of a flat plate, the elastic rubber support members 31 and 32 can substantially assume the form of a rectangular parallelepiped block which is slightly inclined with respect to the vertical direction. Substantially assuming the form of a rectangular parallelepiped block, the elastic rubber support members 31 and 32 exhibit enhanced rigidity with respect to the vertical direction of vehicle. Therefore, as compared with the conventional vibration isolation mount, the elastic rubber support members 31 and 32 can be reduced in wall thickness as measured along the longitudinal direction of the rear engine mount 10. As a result, the spring constant of the elastic rubber support members 31 and 32 can be reduced with respect to the right-and-left and front-and-rear directions of vehicle.

End engagement portions 35 and 36 of the elastic rubber support members 31 and 32 are press-fitted in the corresponding retaining portions 22 and 23 of the lower metal plate member 21 in such a manner as to be press-fitted in the corresponding recesses 22a and 23a while being compressed through abutment with the paired first engagement portions 25a and 26a standing at the longitudinally opposite ends of the lower metal plate member 21 and abutment with two pairs of second engagement portions 25b and 26b, each pair standing at the laterally opposite ends of the lower metal plate member 21. Thus, even though the elastic rubber support members 31 and 32 are not bonded to the retaining portions 22 and 23, the elastic rubber support members 31 and 32 are firmly fixed through fitting. Furthermore, a pair of positioning protrusions 37 (38) provided at outer corners of the engagement portion 35 (36) protrude to the backside of the retaining portion 22 (23) through cutout portions provided between the first and second engagement portions 25a and 25b (26a and 26b) to thereby be caught on the first and second engagement portions 25a and 25b (26a and 26b). Thus, the positioning protrusions 37 and 38 reliably prevent longitudinal and lateral movement of the end portions of the elastic rubber support members 31 and 32 in the rear engine mount 10.

According to the above-described first embodiment, the second stopper portion 16 is formed such that the horizontal plate member 17, which is a separate member, is welded to the vertical plate portions 29, which are formed through bending in such a manner as to stand on the connection plate portion 24. However, a member having vertical plate portions and a horizontal plate portion may be formed separately from the connection plate portion of the lower metal plate member. In this case, the vertical plate portions of the member are welded to the connection plate portion.

Second Embodiment

Next, a second embodiment of the present invention will be described in detail with reference to the drawings.

Figure 9:
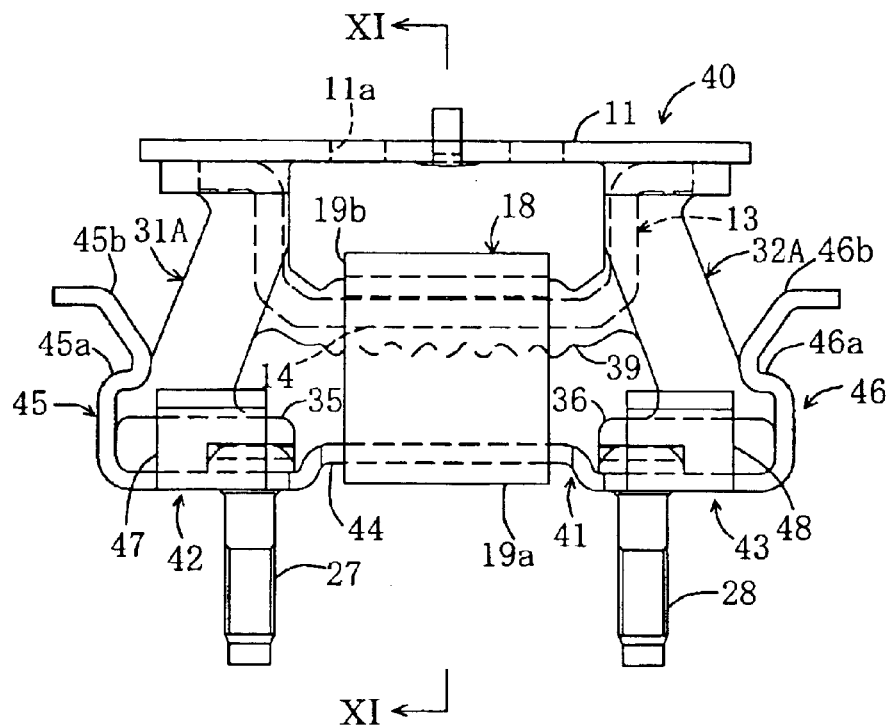
FIG. 9 is a front view schematically showing a rear engine mount according to a second embodiment of the present invention.
Figure 10:
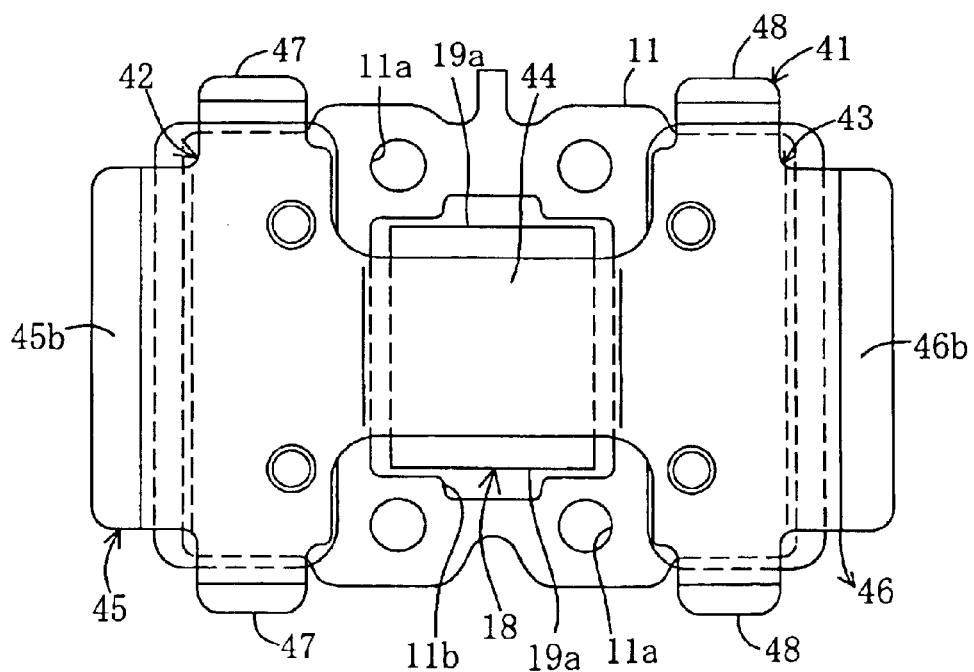
FIG. 10 is a bottom view schematically showing the rear engine mount of FIG. 9.
Figure 11:
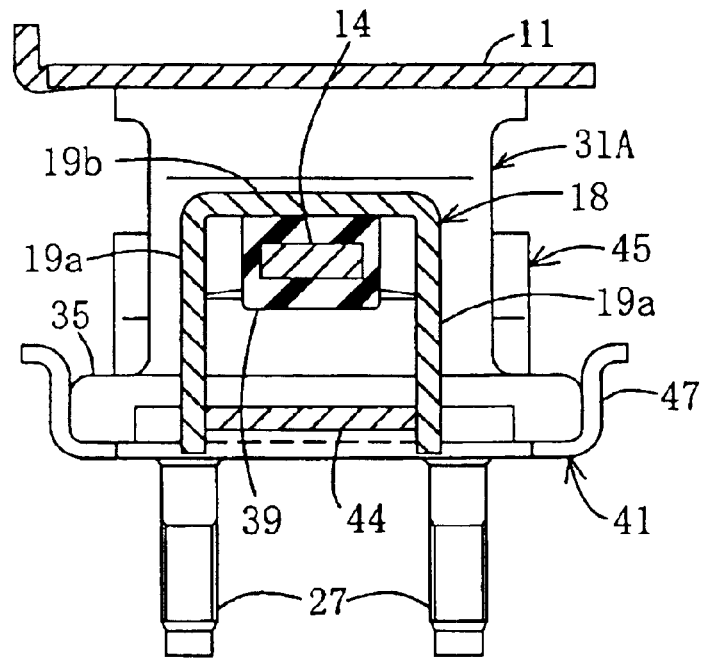
FIG. 11 is a schematic sectional view of the rear engine mount taken along line XI—XI of FIG. 9.

As shown in FIGS. 9 to 11, a rear engine mount 40 of the second embodiment is configured such that a first engagement portion 45 (46), which constitutes a retaining portion 42 (43) of a lower metal plate member 41, is bent longitudinally inward at an intermediate height position so as to form a slightly protruding inclined portion 45a (46a) and such that an end portion extending from the inclined portion 45a (46a) is bent longitudinally outward so as to form a backward bend portion 45b (46b) having a horizontal end part. As a result, the retaining portion 42 (43) has a pocket structure formed such that an intermediate part of the first engagement portion 45 (46) protrudes inward of the lower metal plate member 21 relative to the base portion thereof. Second engagement portions 47 and 48 stand at laterally opposite ends of the retaining portions 42 and 43 as in the case of the above-described second engagement portions 25b and 26b.

A connection plate portion 44 of the lower metal plate member 41 assumes a substantially square shape. A U-shaped second metal stopper member (second stopper portion) 18, which is a separate member, is welded in a standing condition to the lower metal plate member 41 at laterally opposite positions. The second metal stopper member 18 is formed by bending an elongated metal plate into a shape resembling the letter U and includes a pair of mutually facing vertical plate portions 19a and a horizontal plate portion 19b extending between upper ends of the vertical plate portions 19a. The second metal stopper member 18 is disposed in a posture resembling the inverted letter U, and the lower ends of the vertical plate portions 19a are welded to the laterally opposite ends of the connection plate portion 44 such that the connection plate portion 44 is held between the lower ends of the paired vertical plate portions 19a. Also, the second metal stopper member 18 is disposed such that the horizontal plate portion 19b extends over the bottom plate 14, which is covered with the elastic rubber covering portion 39, of the metal stopper member 13, thereby surrounding the bottom plate 14. Elastic rubber support members 31A and 32A differ from the above-described elastic rubber support members 31 and 32 in that the positioning protrusions 37 and 38 are not formed. In order to reduce the weight of the upper metal plate member 11, a substantially rectangular center hole 11b which is slightly wider than the horizontal plate portion 19b is formed at the center of the upper metal plate member 11. The metal stopper member 13 is similar to that of the above-described first embodiment. Other structural features similar to those of the first embodiment are denoted by common reference numerals.

The thus-configured second embodiment yields effect similar to that which the above-described first embodiment yields. Specifically, for example, upon input of an excessive rebound, the horizontal plate portion 19b of the second metal stopper member 18 abuts the bottom plate 14 of the metal stopper member 13, thereby suppressing excessive deformation of the elastic rubber support members 31A and 32A in the vertical direction. In the second embodiment, the engagement portions 35 and 36 of the elastic rubber support members 31A and 32A are press-fitted in the corresponding retaining portions 42 and 43 of the lower metal plate member 41 while being firmly caught in the inlet-narrowed first engagement portions 45 and 46. Therefore, the elastic rubber support members 31A and 32A are more firmly fitted in the corresponding retaining portions 42 and 43. Also, lateral movement of the elastic rubber support members 31A and 32A is reliably prevented by means of the second engagement portions 47 and 48.

Furthermore, the first engagement portion 45 (46) is bent longitudinally inward at an intermediate height position so as to form the slightly protruding inclined portion 45a (46a), and an end portion extending from the inclined portion 45a (46a) is bent longitudinally outward so as to form a backward bend portion 45b (46b). Thus, while being guided along the backward bend portion 45b (46b), the engagement portion 35 (36) of the elastic rubber support member 31A (32A) is smoothly fitted into the retaining portion 42 (43). Also, since the second metal stopper member 18 is easily formed by bending an elongated metal plate without need to carry out any additional work on the lower metal plate member 41, the cost of manufacturing the second metal stopper member 18 is reduced as compared with the case of manufacturing the above-mentioned second stopper portion 16.

Third Embodiment

Next, a third embodiment of the present invention will be described in detail with reference to the drawings.

Figure 12:
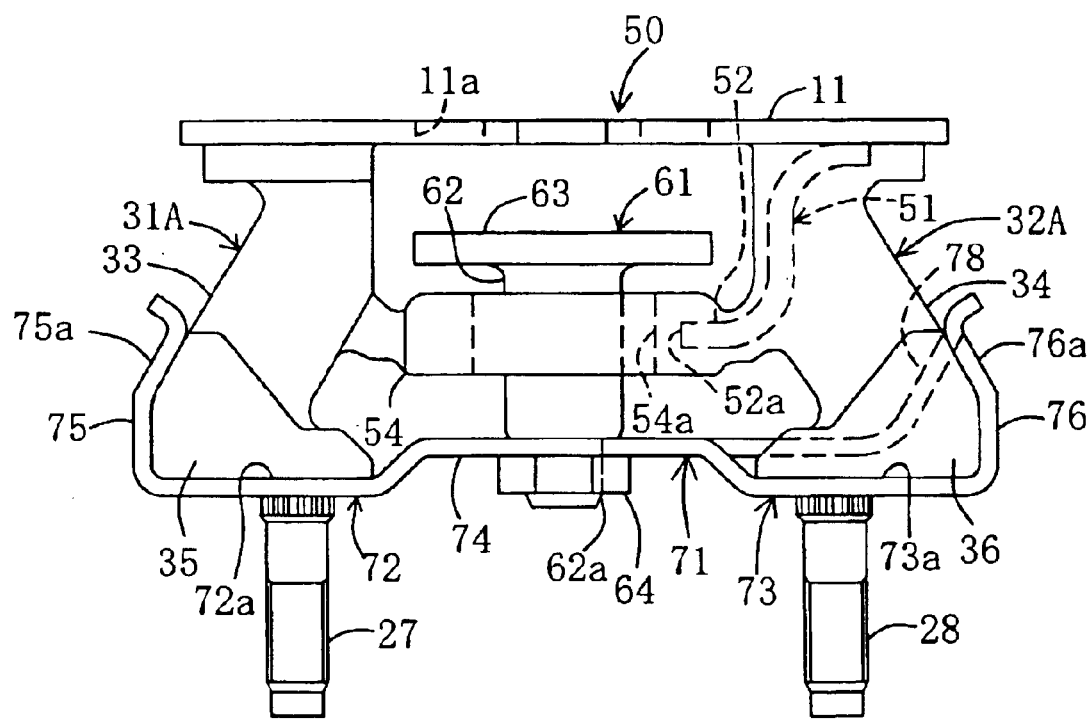
FIG. 12 is a front view schematically showing a rear engine mount according to a third embodiment of the present invention.
Figure 13:
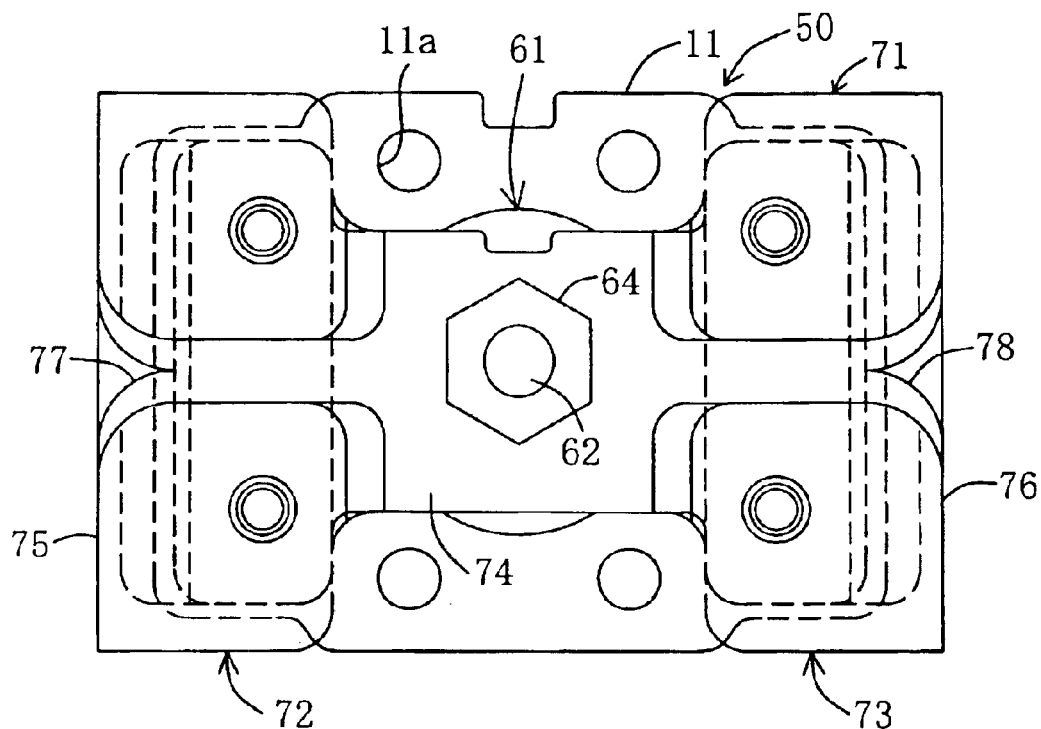
FIG. 13 is a bottom view schematically showing the rear engine mount of FIG. 12.
Figure 14:
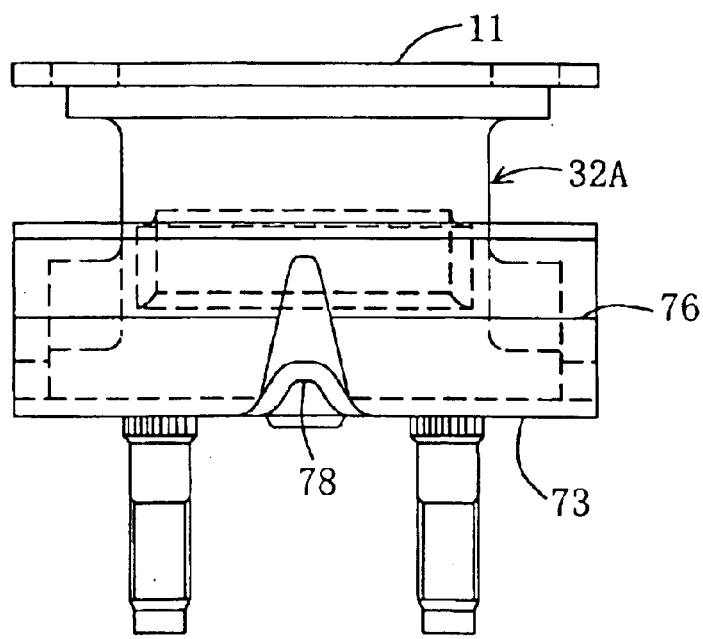
FIG. 14 is a side view schematically showing the rear engine mount of FIG. 12.
Figure 15:
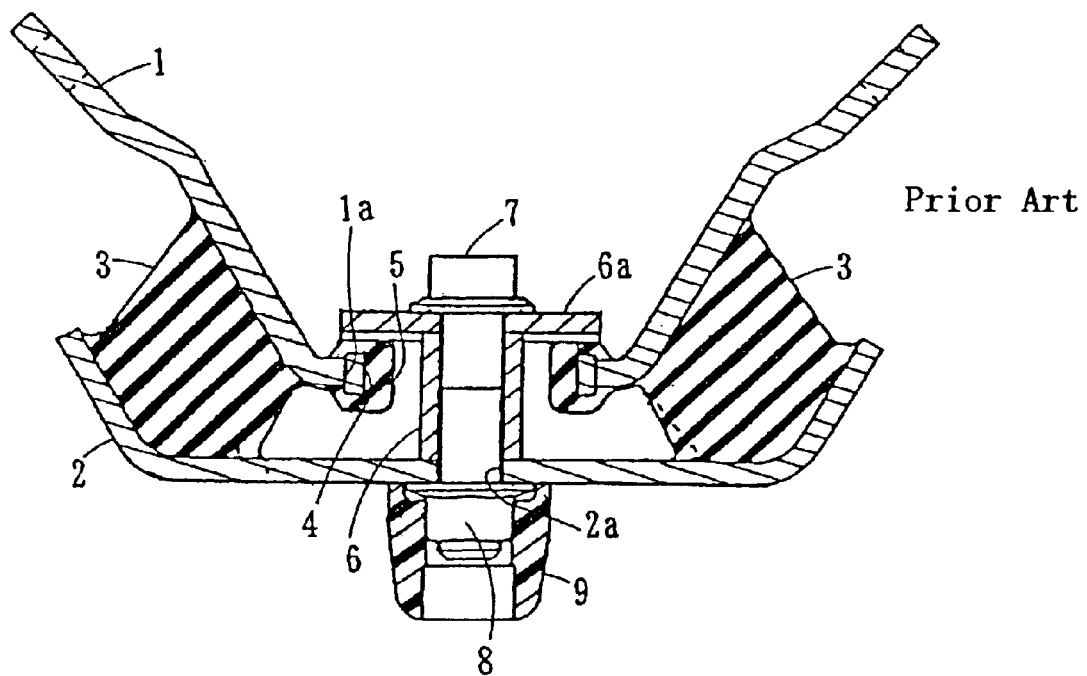
FIG. 15 is a front view schematically showing a conventional engine mount.

As shown in FIGS. 12 to 14, a rear engine mount 50 of the third embodiment is configured such that a circular through-hole 52a is formed at the center of a bottom plate 52 of a first metal stopper member 51, which serves as the first stopper member, fixedly attached to the upper metal plate member 11. A through-hole 54a is formed, concentrically with the through-hole 52a, in an elastic rubber covering portion 54 which covers the bottom plate 52. A second stopper member 61 includes a vertical member 62 made of a metallic round bar, and a metallic stopper disk 63, which is fixedly attached to the top end of the vertical member 62 and has a diameter greater than that of the through-hole 52a. A lower end portion of the vertical member 62 is formed into a threaded portion 62a. The vertical member 62 is caused to stand on a connection plate portion 74 of a lower metal plate member 71, which will be described later, in the following manner: the vertical member 62 is passed through a through-hole formed at the center of the connection plate portion 74, and a nut 64 is screw-engaged with the threaded portion 62a which protrudes downward from the connection plate portion 74. The upper end of the vertical member 62 protrudes toward the upper metal plate member 11 from the bottom plate 52, so that the stopper disk 63 can be caught on the periphery of the through-hole 52a.

The lower metal plate member 71 is formed such that a first engagement portion 75 (76), which constitutes a retaining portion 72 (73), is bent longitudinally inward at an intermediate height position so as to form an inclined portion 75a (76a) which is inclined toward the inside of the lower metal plate member 21 relative to the base portion thereof, thereby assuming an inlet-narrowed pocket-like structure. An end part of the inclined portion 75a (76a) is slightly bent longitudinally outward so as to facilitate the work of fitting the engagement portion 35 (36) of the elastic rubber support member 31A (32A) into the retaining portion 72 (73). Furthermore, the lower metal plate member 71 does not employ the second engagement portions 25b and 26b which are employed in the first and second embodiments, but employs linear protrusions 77 and 78. Specifically, in place of the second engagement portions 25b and 26b, the linear protrusions 77 and 78 are provided in recesses 72a and 73a of the retaining portions 72 and 73 of the lower metal plate member 71 at respective intermediate positions with respect to the front-and-rear direction in such a manner as to extend in the right-and-left direction. Engagement grooves are formed on the corresponding engagement portions 35 and 36 of the elastic rubber support members 31A and 32A so as to be engaged with the protrusions 77 and 78. Other structural features are similar to those of the above-described second embodiment.

The thus-configured third embodiment functions in the following manner. Upon input of an excessive rebound in the vertical direction, the stopper disk 63 of the second stopper member 61 abuts the bottom plate 52 of the metal stopper member 51 at the periphery of the through-hole 52a, thereby suppressing excessive deformation of the elastic rubber support members 31A and 32A in the vertical direction. Thus, separation of the upper metal plate member 11 and the lower metal plate member 71 is reliably prevented. Upon input of excessive vibration component in the right-and-left direction, the vertical member 62 of the second stopper member 61 abuts the bottom plate 52 of the metal stopper member 51 at the wall of the through-hole 52a, thereby suppressing excessive deformation. Upon input of excessive vibration component in the front-and-rear direction, the vertical member 62 of the second stopper member 61 abuts the bottom plate 52 of the metal stopper member 51 at the wall of the through-hole 52a, thereby suppressing excessive deformation. In this manner, excessive deformation in the vertical, front-and-rear, and right-and-left directions is suppressed, whereby the durability of the elastic rubber support members 31A and 32A is ensured. Furthermore, riding comfort of a vehicle is improved, and steering stability of the vehicle is enhanced.

Also, as in the case of the above-described first and second embodiments, the number of metal members used in the rear engine mount 50 is considerably reduced as compared with the conventional vibration isolation mount, thereby considerably reducing the cost of metal members. As in the case of the first and second embodiments, the cost of welding and the cost of rubber vulcanization molding are considerably reduced as compared with the conventional vibration isolation mount.

In the third embodiment, the engagement portions 35 and 36 of the elastic rubber support members 31A and 32A are press-fitted in the corresponding retaining portions 72 and 73 of the lower metal plate member 41 while being firmly caught in the inlet-narrowed, pocket-like first engagement portions 75 and 76. Therefore, the elastic rubber support members 31A and 32A are more firmly fitted in the corresponding retaining portions 72 and 73. Also, the engagement grooves formed in the engagement portions 35 and 36 of the elastic rubber support members 31A and 32A are engaged with the protrusions 77 and 78, whereby the elastic rubber support members 31A and 32A are firmly fixed. Thus, as in the case where the second engagement portions 25b and 26b are provided, lateral movement of the elastic rubber support members 31A and 32A is reliably prevented. Effect that results from imparting a form resembling a flat plate to the upper and lower metal plate members 11 and 71 and a form resembling a rectangular parallelepiped block to the elastic rubber support members 31A and 32A, and effect that results from the elastic rubber support members 31A and 32A being not bonded to the lower metal plate member 71 are similar to those as described with reference to the first and second embodiments.

Notably, in the above-described third embodiment, in addition to the first engagement portions 75 and 76, second engagement portions may also be provided such that each of the second engagement portions is bent laterally inward at an intermediate height position so as to form a pocket-like structure facing the inside of the lower metal plate member. In this case, the protrusions provided on the lower metal plate member 71 are eliminated. Alternatively, in place of the first engagement portions 75 and 76, second engagement portions may be provided such that each of the second engagement portions is bent laterally inward at an intermediate height position so as to form a pocket-like structure facing the inside of the lower metal plate member. In this case, protrusions may be provided on the lower metal plate member at longitudinally intermediate positions, and engagement grooves may be formed on end portions of elastic rubber support members so as to be engaged with the corresponding protrusions. This yields effect similar to that as described with reference to the third embodiment.

The above embodiments are described while mentioning the upper metal plate member to be mounted on the transmission of a vehicle, and the lower metal plate member to be mounted on the frame of the vehicle body. However, this may be reversed. The above-described embodiments are mere examples, and the present invention may be embodied in various other forms without departing from the scope of the invention.

What is claimed is:

1. A vibration isolation mount comprising:
   a first plate metal member assuming a rectangular shape;
   a U-shaped first stopper member comprising a pair of side plates and a bottom plate, end portions of the side plates being fixedly attached to one plane of the first plate metal member at opposite end portions of the plane, so that the first stopper member stands on the plane;
   a second plate metal member disposed a predetermined distance away from the first plate metal member in such a manner that the second plate metal member faces the first plate metal member, with the first stopper member disposed therebetween, the second plate metal member comprising a retaining portion provided at each of opposite ends thereof located in opposition to the opposite end portions of the first plate metal member;
   a second stopper member provided on the second plate metal member at a longitudinally intermediate position in such a manner as to stand toward the first plate metal member, an end portion of the second stopper member being able to be caught by the bottom plate of the first stopper member on a side toward the first plate metal member so as to restrict a distance between the first plate metal member and the second plate metal member to a predetermined range;
   a pair of elastic rubber support members bonded to the plane of the first plate metal member at the opposite end portions of the plane and extending toward the second plate metal member, end portions of the elastic rubber support members being press-fitted in the corresponding retaining portions of the second plate metal member so as to elastically connect the first and second plate metal members; and
   an elastic rubber covering portion formed integrally with the elastic rubber support members and covering a surface of the bottom plate of the first stopper member.

2. A vibration isolation mount according to claim 1, wherein the second stopper member is formed in a U-like shape and disposed in such a manner as to surround the bottom plate, the second stopper member including a pair of vertical plate portions standing on the second platelike metal member at a longitudinally intermediate position so as to sandwich the bottom plate of the first stopper member in a width direction thereof in such a manner that the vertical plate portions are separated from the bottom plate of the first stopper member, and a horizontal plate portion which connects the vertical plate portions.

3. A vibration isolation mount according to claim 1, wherein a through-hole is provided at a center of the bottom plate of the first stopper member, and the second stopper member comprises a vertical portion standing on the second platelike metal member at a longitudinally intermediate position and extending through the through-hole toward the first platelike metal member, and a stopper plate fixedly attached to an end of the vertical portion in such a manner as to be able to be caught by the bottom plate.

4. A vibration isolation mount according to claim 1, wherein the first platelike metal member and the second platelike metal member substantially assume the form of a flat plate, and the elastic rubber support members substantially assume the form of a rectangular parallelepiped block.

5. A vibration isolation mount according to claim 1, wherein the retaining portions of the second platelike metal member comprise a pair of first engagement portions standing toward the first platelike metal member at corresponding longitudinal ends of the second platelike metal member, two pairs of second engagement portions, each pair standing toward the first platelike metal member at laterally opposite ends of the second platelike metal member and in the vicinity of the corresponding longitudinal end of the second platelike metal member, and a pair of recess portions each provided between the corresponding first engagement portion and the corresponding paired second engagement portions.

6. A vibration isolation mount according to claim 5, wherein the first engagement portions and/or the second engagement portions are bent toward the corresponding recess portions of the second platelike metal member in such a manner as to overhang the recess portions.

7. A vibration isolation mount according to claim 6, wherein end parts of the first engagement portions and/or end parts of the second engagement portions are bent away from the corresponding recess portions.

8. A vibration isolation mount according to claim 5, wherein in place of the first engagement portions, a first linear protrusion is provided in each of the recess portions of the second platelike metal member at a longitudinally intermediate position in such a manner as to protrude toward the same side as do the second engagement portions and to extend in a lateral direction, or in place of the second engagement portions, a second linear protrusion is provided in each of the recess portions of the second platelike metal member at a laterally intermediate position in such a manner as to protrude toward the same side as do the first engagement portions and to extend in a longitudinal direction, and wherein an engagement groove is formed on each of end portions of the elastic rubber support members so as to be engaged with the first protrusion or the second protrusion.

9. A vibration isolation mount according to claim 5, wherein end portions of the elastic rubber support members to be press-fitted into the corresponding retaining portions comprise positioning protrusions protruding to the outside of the retaining portions through cutout portions provided between the first and second engagement portions so as to be caught on the first and second engagement portions.

10. A vibration isolation mount according to claim 2, wherein the retaining portions of the second platelike metal member comprise a pair of first engagement portions standing toward the first platelike metal member at corresponding longitudinal ends of the second platelike metal member, two pairs of second engagement portions, each pair standing toward the first platelike metal member at laterally opposite ends of the second platelike metal member and in the vicinity of the corresponding longitudinal end of the second platelike metal member, and a pair of recess portions each provided between the corresponding first engagement portion and the corresponding paired second engagement portions.

11. A vibration isolation mount according to claim 10, wherein the first engagement portions and/or the second engagement portions are bent toward the corresponding recess portions of the second platelike metal member in such a manner as to overhang the recess portions.

12. A vibration isolation mount according to claim 11, wherein end parts of the first engagement portions and/or end parts of the second engagement portions are bent away from the corresponding recess portions.

13. A vibration isolation mount according to claim 10, wherein in place of the first engagement portions, a first linear protrusion is provided in each of the recess portions of the second platelike metal member at a longitudinally intermediate position in such a manner as to protrude toward the same side as do the second engagement portions and to extend in a lateral direction, or in place of the second engagement portions, a second linear protrusion is provided in each of the recess portions of the second platelike metal member at a laterally intermediate position in such a manner as to protrude toward the same side as do the first engagement portions and to extend in a longitudinal direction, and wherein an engagement groove is formed on each of end portions of the elastic rubber support members so as to be engaged with the first protrusion or the second protrusion.

14. A vibration isolation mount according to claim 3, wherein the retaining portions of the second platelike metal member comprise a pair of first engagement portions standing toward the first platelike metal member at corresponding longitudinal ends of the second platelike metal member, two pairs of second engagement portions, each pair standing toward the first platelike metal member at laterally opposite ends of the second platelike metal member and in the vicinity of the corresponding longitudinal end of the second platelike metal member, and a pair of recess portions each provided between the corresponding first engagement portion and the corresponding paired second engagement portions.

15. A vibration isolation mount according to claim 14, wherein the first engagement portions and/or the second engagement portions are bent toward the corresponding recess portions of the second platelike metal member in such a manner as to overhang the recess portions.

16. A vibration isolation mount according to claim 15, wherein end parts of the first engagement portions and/or end parts of the second engagement portions are bent away from the corresponding recess portions.

17. A vibration isolation mount according to claim 14, wherein in place of the first engagement portions, a first linear protrusion is provided in each of the recess portions of the second platelike metal member at a longitudinally intermediate position in such a manner as to protrude toward the same side as do the second engagement portions and to extend in a lateral direction, or in place of the second engagement portions, a second linear protrusion is provided in each of the recess portions of the second platelike metal member at a laterally intermediate position in such a manner as to protrude toward the same side as do the first engagement portions and to extend in a longitudinal direction, and wherein an engagement groove is formed on each of end portions of the elastic rubber support members so as to be engaged with the first protrusion or the second protrusion.

18. A vibration isolation mount according to claim 4, wherein the retaining portions of the second platelike metal member comprise a pair of first engagement portions standing toward the first platelike metal member at corresponding longitudinal ends of the second platelike metal member, two pairs of second engagement portions, each pair standing toward the first platelike metal member at laterally opposite ends of the second platelike metal member and in the vicinity of the corresponding longitudinal end of the second platelike metal member, and a pair of recess portions each provided between the corresponding first engagement portion and the corresponding paired second engagement portions.

19. A vibration isolation mount according to claim 18, wherein the first engagement portions and/or the second engagement portions are bent toward the corresponding recess portions of the second platelike metal member in such a manner as to overhang the recess portions.

20. A vibration isolation mount according to claim 19, wherein end parts of the first engagement portions and/or end parts of the second engagement portions are bent away from the corresponding recess portions.

* * * * *